US012792242B2

(12) United States Patent
Kim et al.

(10) Patent No.: US 12,792,242 B2
(45) Date of Patent: Nov. 10, 2026

(54) TEMPERATURE-AWARE PROGRAMMING OF FLASH MEMORY

(71) Applicant: SAMSUNG ELECTRONICS CO., LTD., Suwon-si (KR)

(72) Inventors: Jonghwa Kim, Suwon-si (KR); Jeong Uk Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 18/483,437

(22) Filed: Oct. 9, 2023

(65) Prior Publication Data

US 2024/0311028 A1 Sep. 19, 2024

(30) Foreign Application Priority Data

Mar. 15, 2023 (KR) ........................ 10-2023-0033997

(51) Int. Cl.
*G06F 3/06* (2006.01)

(52) U.S. Cl.
CPC ............ *G06F 3/064* (2013.01); *G06F 3/0608* (2013.01); *G06F 3/0679* (2013.01)

(58) Field of Classification Search
None
See application file for complete search history.

(56) References Cited

U.S. PATENT DOCUMENTS 8,472,274 B2 6/2013 Fai et al.
9,330,790 B2 5/2016 Kim et al.
10,249,349 B2 4/2019 Takizawa et al.
11,302,385 B2 4/2022 Kim
11,461,039 B2 10/2022 Kurosawa
11,462,256 B2 10/2022 Asami et al.
2015/0092488 A1 4/2015 Wakchaure et al.
2019/0066792 A1 2/2019 Muchherla et al.
2020/0333976 A1* 10/2020 Cariello .................... G01K 3/00
2022/0083243 A1 3/2022 Muchherla et al.
2023/0186996 A1* 6/2023 Song ....................... G11C 16/26
365/189.011
2023/0197168 A1* 6/2023 Song .................. G11C 16/3418
365/185.21
2023/0395170 A1* 12/2023 Rayaprolu .......... G11C 11/5642
2024/0143219 A1* 5/2024 Gao ....................... G06F 3/0659
2024/0233783 A1* 7/2024 Hung ................... G11C 7/1048

FOREIGN PATENT DOCUMENTS

KR 10-2008-0071366 8/2008
KR 10-2011-0001580 1/2011
KR 10-2016-0033147 3/2016
KR 10-2022-0066189 5/2022

OTHER PUBLICATIONS

Extended European Search Report in European Appln. No. 24163960.8, mailed on Jun. 28, 2024, 10 pages.

* cited by examiner

*Primary Examiner* — Hosain T Alam
*Assistant Examiner* — Ryan Dare
(74) *Attorney, Agent, or Firm* — Wolf, Greenfield & Sacks, P.C.

(57) ABSTRACT

A storage device includes a nonvolatile memory comprising a plurality of user blocks and a controller configured to manage the plurality of user blocks in units of super blocks. The controller may perform a first program operation in units of first pages of the super block, and may manage temperature information, associated with the first program operation, in units of a predetermined number of super pages.

17 Claims, 14 Drawing Sheets

| | |
|---|---|
| SP_0,1 | Temp. Info |
| SP_2,3 | Temp. Info |
| SP_4,5 | Temp. Info |
| ⋮ | ⋮ |
| SP_M-1,M | Temp. Info |

FIG. 13A

| | |
|---|---|
| P_0 | Temp. Info |
| P_1 | Temp. Info |
| P_2 | Temp. Info |
| ⋮ | ⋮ |
| P_M | Temp. Info |

FIG. 13B

| | |
|---|---|
| P_0,1 | Temp. Info |
| P_2,3 | Temp. Info |
| P_4,5 | Temp. Info |
| ⋮ | ⋮ |
| P_M-1, M | Temp. Info |

TEMPERATURE-AWARE PROGRAMMING OF FLASH MEMORY

CROSS-REFERENCE TO RELATED APPLICATION

This application claims benefit of priority to Korean Patent Application No. 10-2023-0033997, filed on Mar. 15, 2023, in the Korean Intellectual Property Office, the disclosure of which is incorporated herein by reference in its entirety.

BACKGROUND

The present disclosure relates to a storage device and a method of operating the same.

A semiconductor memory device is a memory device implemented using semiconductor materials such as silicon (Si), germanium (Ge), gallium arsenide (GaAs), and indium phosphide (InP). In general, semiconductor memory devices are classified into volatile memory devices and nonvolatile memory devices.

Volatile memory devices lose stored data thereof when power supplies thereof are interrupted. The volatile memory devices include a static random access memory (SRAM), a dynamic random access memory (DRAM), a synchronous DRAM (SDRAM), and the like. Meanwhile, nonvolatile memory devices retain stored data thereof even when power supplies thereof are interrupted. The nonvolatile memory devices include a read-only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (ReRAM), a ferroelectric RAM (FRAM), and the like.

A flash memory has been used in a variety of fields due to features thereof such as a high operation speed and low power consumption. In general, since characteristics of a flash memory are affected by a temperature at a time point at which a program operation is performed, there is a need to store information of a temperature at the time of performing the program operation and to utilize the stored information of the temperature in an operation of the flash memory. In this case, the amount of stored temperature information is increased as capacity of the flash memory is increased. Accordingly, there is an increasing need for technology allowing usage of a working memory to be reduced by more efficiently managing temperature information.

SUMMARY

Example embodiments provide a storage device for more efficiently storing temperature information to reduce usage of a working memory, and a method of operating the same.

According to an example embodiment, a storage device includes a nonvolatile memory comprising a plurality of user blocks and a controller configured to manage the plurality of user blocks in units of super blocks. The controller may perform a first program operation in units of first pages of the super block, and may manage temperature information, associated with the first program operation, in units of a predetermined number of super pages.

The storage device may include a temperature sensor and a working memory. The controller may obtain temperature information through the temperature sensor based on the first program operation, match the obtained temperature information with identification information of the predetermined number of super pages, and store the matched temperature information in the working memory.

The nonvolatile memory may include a plurality of reserved blocks replacing a bad block when among the plurality of user blocks, a user block is turned into the bad block, and the controller may perform a second program operation on the plurality of reserved blocks in units of pages and may manage temperature information, associated with the second program operation, in units of a predetermined number of pages.

The controller may obtain temperature information through the temperature sensor based on the second program operation, match the obtained temperature information with identification information of the predetermined number of pages, and store the matched temperature information in the working memory.

The controller may update the obtained temperature information in a temperature table loaded into the working memory, and the temperature table may include a first area, in which temperature information on the plurality of user blocks is managed in units of the super blocks, and a second area in which temperature information on the plurality of reserved blocks is managed in units of the blocks.

The first area may include first sub-temperature tables in which temperature information on user blocks, included in each of the super blocks, is stored in units of the predetermined number of super pages, and the second area may include second sub-temperature tables in which temperature information on each of the reserved blocks is stored in units of the predetermined number of pages.

The controller may be configured to update the obtained temperature information in the first area when a location, in which the program operation is performed, is included in the plurality of user blocks and update the obtained temperature information in the second area when the location, in which the program operation is performed, is included in the plurality of reserved blocks.

The controller may be configured to store the temperature table, stored in the working memory, in the nonvolatile memory for an idle time or while power of the storage device is turned off and load the temperature table, stored in the nonvolatile memory, into the working memory when the power of the storage device is turned on.

The controller may perform a read operation based on the temperature table loaded into the working memory.

The nonvolatile memory may be a NAND flash memory, and the working memory may include at least one of a DRAM and an SRAM.

According to an example embodiment, a method of operating a storage device, including a nonvolatile memory including a plurality of user blocks, includes performing a first program operation in units of super pages of a super block into which the plurality of user blocks are grouped and managing temperature information, associated with the first program operation, in units of a predetermined number of super pages.

The managing the temperature information, associated with the first program operation, in units of the predetermined number of super pages may include obtaining temperature information based on the first program operation and matching the obtained temperature information with identification information of the predetermined number of super pages and storing the matched temperature information.

The nonvolatile memory may include a plurality of reserved blocks replacing a bad block when among the plurality of user blocks, a user block is turned into the bad block. The method may include performing a second program operation on the plurality of reserved blocks in units of pages and managing temperature information, associated with the second program operation, in units of a predetermined number of pages.

The managing the temperature information, associated with the second program operation, in units of the predetermined number of pages may include obtaining temperature information based on the second program operation and matching the obtained temperature information with identification information of the predetermined number of pages and storing the matched temperature information.

The storing the matched temperature information may include updating the obtained temperature information in a temperature table, and the temperature table may include a first area, in which temperature information on the plurality of user blocks is managed in units of the super blocks, and a second area in which temperature information on the plurality of reserved blocks is managed in units of the blocks.

The first area may include first sub-temperature tables in which temperature information on user blocks, included in each of the super blocks, is stored in units of the predetermined number of super pages, and the second area may include second sub-temperature tables in which temperature information on each of the reserved blocks is stored in units of the predetermined number of pages.

The updating the obtained temperature information in the temperature table may include updating the obtained temperature information in the first area when a location, in which the first program operation is performed, is included in the plurality of user blocks and updating the obtaining information in the second area when the location, in which the second program operation is performed, is included in the plurality of reserved blocks.

The method may include performing a read operation based on the temperature table.

According to an example embodiment, a controller controlling an operation of a nonvolatile memory including a plurality of user blocks includes a working memory and a processor configured to manage the plurality of user blocks in units of super blocks. The processor may perform a first program operation in units of super pages of the super blocks, and may store temperature information, associated with the first program operation, in the working memory in units of a predetermined number of super pages.

The nonvolatile memory may include a plurality of reserved blocks replacing a bad block when among the plurality of user blocks, a user blocks is turned into the bad block, and the processor may perform a second program operation on the plurality of reserved blocks in units of blocks, and may store temperature information, associated with the second program operation, in the working memory in units of a predetermined number of pages.

BRIEF DESCRIPTION OF DRAWINGS

The above and other aspects, features, and advantages of the present disclosure will be more clearly understood from the following detailed description, taken in conjunction with the accompanying drawings.

FIG. 13A is a diagram illustrating an example of a sub-temperature table for the reserved block of FIG. 12.

FIG. 13B is a diagram illustrating another example of a sub-temperature table for the reserved block of FIG. 12.

DETAILED DESCRIPTION

Hereinafter, example embodiments will be described with reference to the accompanying drawings.

The terms “first,” “second,” etc. used herein are used to identify a plurality of components from one another, and are not intended to limit the order or importance of the relevant components.

Figure 1:
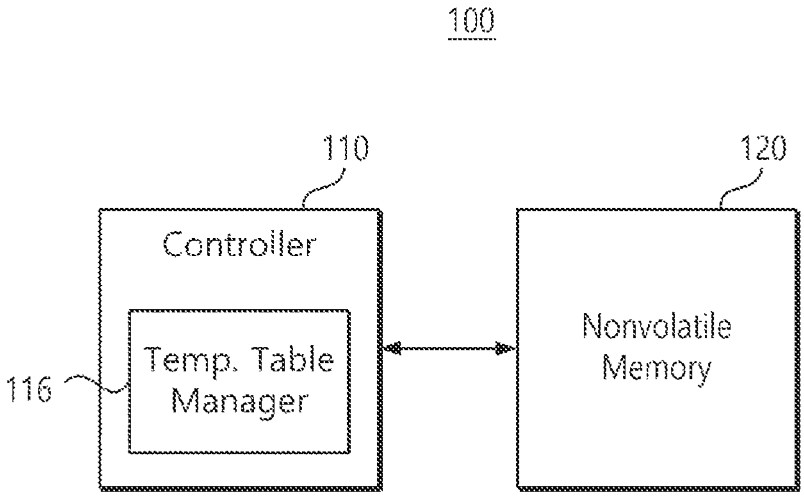
FIG. 1 is a block diagram of a storage device according to an example embodiment.

FIG. 1 is a block diagram of a storage device according to an example embodiment. Referring to FIG. 1, a storage device 100 may include a controller 110 and a nonvolatile memory 120.

The non-volatile memory 120 may program data, received from the controller 110, or transmit stored data to the controller 110 under the control of the controller 110. For example, it will be assumed that the nonvolatile memory 120 includes NAND flash memories. However, example embodiments are not limited thereto, and the nonvolatile memory 120 may include nonvolatile memory devices such as a NAND flash memory, a PRAM, an ReRAM, an MRAM, and an FRAM that have a three-dimensional structure.

The controller 110 may control the overall operation of the storage device 100. For example, the controller 110 may program data received from an external device into the nonvolatile memory 120, or may read data stored in the nonvolatile memory 120.

A threshold voltage Vth of a memory cell included in the nonvolatile memory 120 may be affected by a temperature at the time of performing a program operation. Accordingly, an error may occur when a read operation is performed without consideration of the temperature at the time of performing the program operation. To prevent the occurrence of the error, the controller 110 may store temperature information at the time of performing the program operation in a working memory, and may perform a read operation using the stored temperature information.

In this case, the controller 110 may store temperature information for each program operation, resulting in an issue in which usage of a working memory for storing the temperature information is increased as capacity of the nonvolatile memory 120 is increased.

In general, a temperature of the nonvolatile memory 120 is unlikely to significantly change while a program operation is performed. Therefore, by defining a unit group of the nonvolatile memory 120 having temporal simultaneity associated with the program operation and storing and managing information on a representative temperature at the time of performing the program operation in units of defined groups, memory usage associated with temperature information may be reduced.

For example, the controller 110 may manage a plurality of user blocks, included in the nonvolatile memory 120, in units of super blocks. For example, the controller 110 may perform a program operation in units of super pages, and may perform an erase operation in units of super blocks. The term "super block" refers to a block formed by grouping a plurality of user blocks based on a predetermined criterion.

In a system managing user blocks in units of super blocks, each super page of a super block has temporal simultaneity associated with a program operation. For example, pages included in a single super page are near-simultaneously subjected to a program operation. Accordingly, temperature information associated with the program operation may be managed in units of a predetermined number of super pages to reduce memory usage associated with the temperature information.

To this end, according to an example embodiment, the controller 110 may manage temperature information, associated with a program operation, in units of a predetermined number of super pages. For example, the controller 110 may manage the temperature information in units of a single super page. Alternatively, the controller 110 may manage the temperature information in units of two or more super pages. According to example embodiments, the controller 110 may manage the temperature information in units of super blocks, for example, in units of all super pages included in the super blocks.

According to an example embodiment, the controller 110 may include a temperature table manager 116. The temperature table manager 116 may manage a temperature table, in which the temperature information at the time of performing the program operation of the nonvolatile memory 120 is listed, in units of a predetermined number of super pages. For example, the temperature table manager 116 may obtain temperature information based on a program operation in units of super pages, and may update the obtained temperature information in the temperature table loaded into the working memory.

Figure 2:
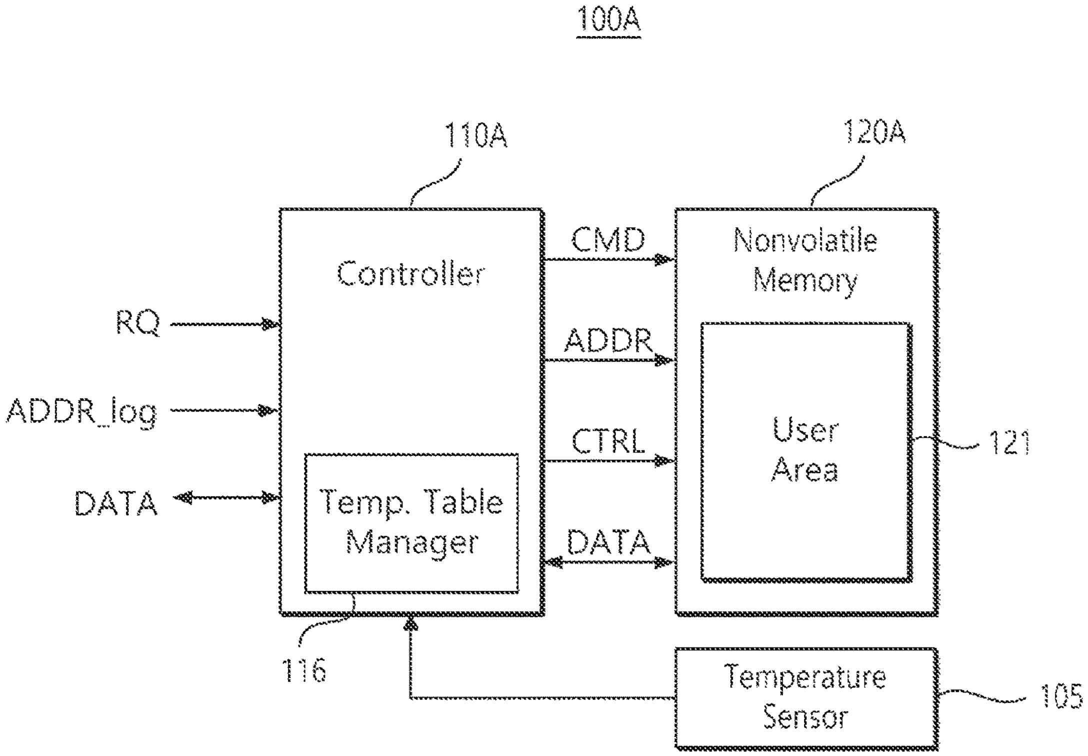
FIG. 2 is a block diagram illustrating an example of implementing a storage device according to an example embodiment.

FIG. 2 is a block diagram illustrating an example of implementing a storage device according to an example embodiment.

Referring to FIG. 2, a storage device 100A may include a controller 110A and a nonvolatile memory 120A.

The memory controller 110A and the nonvolatile memory device 120A may be provided by different chips, different packages, and different modules, respectively. The memory controller 110A and the nonvolatile memory device 120A may be electrically connected to each other. The memory controller 110A and the nonvolatile memory device 120A may be mounted based on packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline Package (TSOP), Thin Quad Flatpack (TQFP), System In Package (SIP), Multi Chip Package (MCP), Wafer-level Fabricated Package (WFP), Wafer-Level Processed Stack Package (WSP) to be provided as a nonvolatile memory system.

The controller 110A may receive a program or read request (RQ), an address ADDR_log, and data (DATA) from an external device (for example, a host, an application processor, or the like), and may control the nonvolatile memory 120A in response to the received signals. For example, the controller 110A may program the DATA, received from the external device, into the nonvolatile memory 120A, or may transmit a command (CMD), an address ADDR, and a control signal (CTRL) to the nonvolatile memory 120A to read DATA stored in the nonvolatile memory 120A.

For example, the address ADDR_log received from the external device may be a logical address, and the address ADDR transmitted to the nonvolatile memory 120A may be a physical address of the nonvolatile memory 120A. The controller 110A may manage address translation information based on a mapping table.

The nonvolatile memory 120A may include a user area 121. The user area 121 may be an area in which user data is stored, and may include a plurality of user blocks. In this case, the user data stored in the user area 121 may include various types of data, used or generated in a software layer of an external device, such as a program code and a file.

The temperature sensor 105 may measure a temperature of the nonvolatile memory 120A, and may provide the measured temperature to the controller 110A.

For example, when the controller 110A and the nonvolatile memory 120A are mounted or assembled on a printed circuit board (PCB), the temperature sensor 105 may be connected to the controller 110A through conductive patterns provided on the PCB. In this case, the temperature sensor 105 may be disposed on or inside the nonvolatile memory 120A. Alternatively, the temperature sensor 105 may be disposed adjacent to the nonvolatile memory 120A. Accordingly, temperature information of the nonvolatile memory 120A, measured by the temperature sensor 105, may be provided to the controller 110A.

According to an example embodiment, when the nonvolatile memory 120A is implemented as a plurality of chips or packages, the temperature sensor 105 may be included in each chip or package. In this case, the temperature sensor 105 included in each chip or package may provide temperature information of the nonvolatile memory 120A, included in the corresponding chip or package, to the controller 110A.

According to alternative embodiments, a single temperature sensor 105 may be included for a plurality of chips or packages. In this case, the controller 110A may estimate temperature information of the nonvolatile memory 120A, included in each chip or each package, using the temperature information and offset information obtained through the temperature sensor 105. The offset information may vary depending on a distance or a location relationship between the temperature sensor 105 and chips or packages, and may be obtained in advance through an experiment, a test, a simulation, or the like.

When the storage device 100A is mounted or assembled on a mainboard together with an external device (for example, a host, an application processor, or the like), the temperature sensor 105 may be included outside the storage device 100A. In this case, the controller 110A may estimate the temperature of the nonvolatile memory 120A in consideration of a spatial arrangement of the storage device 100A and the temperature sensor 105.

For example, according to an example embodiment, the controller 110A may manage a plurality of user blocks of the user area 121 in units of super blocks. Accordingly, the controller 110A may perform a first program operation on a plurality of user blocks of the user area 121 in units of super pages (hereinafter, a program operation performed in units of super pages will be referred to as a "first program operation"). The super block and the super page will be described later in detail.

The controller 110A may manage temperature information, associated with the first program operation, in units of a predetermined number of super pages. For example, the controller 110A may obtain temperature information through the temperature sensor 105 based on the first program operation, match the obtained temperature information with identification information of a predetermined number of super pages, and store the matched temperature information in a working memory.

For example, in an example embodiment in which temperature information is managed in units of a single super page, the controller 110A may receive the temperature information of the nonvolatile memory 120A from the temperature sensor 105 when a program operation of a corresponding super page is performed. The obtained temperature information may be matched with identification information of the corresponding super page, and may then be stored in a working memory.

Alternatively, in an example embodiment in which temperature information is managed in units of two super pages, the controller 110A may obtain temperature information of the nonvolatile memory 120A from the temperature sensor 105 when a program operation of corresponding super pages is performed, match the obtained temperature information with the corresponding super pages, and store the matched temperature information in a working memory. In this case, according to an example embodiment, the controller 110A may obtain and store temperature information during a program operation of a super page, programmed first, of the two super pages, or may obtain and store temperature information during a program operation of a super page, programmed later, of the two super pages. Alternatively, temperature information of each of the two super pages may be obtained, and an average value thereof may then be stored.

Example embodiments, in which temperature information is managed in units of three or more super pages, are also possible and will be understood in the same manner as described above.

According to an example embodiment, temperature information may be managed through a temperature table. To this end, the controller 110A may include a temperature table manager 116.

The temperature table manager 116 may manage a temperature table in which a temperature of the nonvolatile memory 120A at the time of performing a program operation is listed.

For example, the temperature table manager 116 may store a temperature table, stored in a working memory, in the nonvolatile memory 120A and may load the temperature table, stored in the nonvolatile memory 120A, into the working memory.

Also, the temperature table manager 116 may update the temperature table. For example, the temperature table may include a first area in which temperature information on a plurality of user blocks, included in the user area 121, is managed in units of super blocks. In this case, the first area may include first sub-temperature tables corresponding to each super block, and temperature information on user blocks included in the corresponding super block may be listed in each of the sub-temperature tables in units of a predetermined number of super pages. Accordingly, the temperature table manager 116 may obtain temperature information from the temperature sensor 105 based on the first program operation and may update the obtained temperature information in the first sub-temperature table to update the temperature table.

As described above, according to example embodiments, the temperature information may be managed in units of a predetermined number of super pages. Thus, memory usage associated with the temperature information may be reduced.

Figure 3:
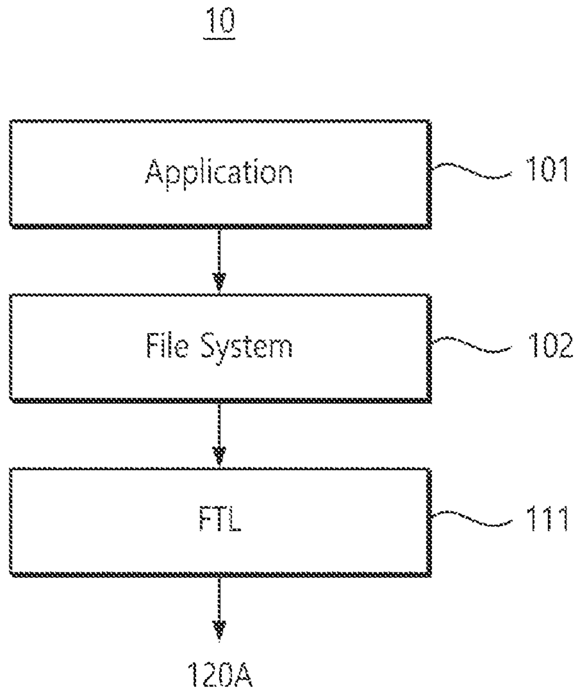
FIG. 3 is a block diagram illustrating an example of a software layer of an external device and the storage device illustrated in FIG. 2.

FIG. 3 is a block diagram illustrating an example of a software layer of an external device and the storage device 100A illustrated in FIG. 2.

Referring to FIGS. 2 and 3, a software layer 10 of the external device and the storage device 100A may include an application 101, a file system 102, and a flash translation layer (hereinafter referred to as "FTL") 111.

The application 101 may refer to various application programs driven in the external device. For example, the application 101 may include an operating system (OS), a word processor, a web browser, a video player, a game program, or the like.

The file system 102 may serve to organize a file or data, used by the application 101, when the file or data is stored in the storage device 100A. For example, the file system 102 may provide a logical address ADDR_log of the file or data to the storage device 100A.

The file system 102 may have a form varying depending on an OS of the external device. For example, the file system 102 may include a FAT (File Allocation Table), a FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, WinFS, or the like. Also, the file system 102 may define data in units of sectors. Also, the file system 102 may be driven by the external device.

The FTL 111 may provide interfacing between the external device and the storage device 100A to efficiently use the storage device 100A. For example, the storage device 100A may program and read data in units of super pages or pages. However, the file system 102 manages a file or data in units of sectors, so that the FTL 111 may serve to receive and translate the logical address ADDR_log into a physical address available in the storage device 100A. The FTL 111 may manage such an address translation operation through a mapping table.

Also, the FTL 111 may manage a plurality of memory blocks, included in the nonvolatile memory 120A, after dividing the plurality of memory blocks into user blocks and reserved blocks. The FTL may perform address translation to write data in the user blocks. In this case, when one of the user blocks is turned into a bad block, the FTL 111 may replace the user block, turned into the bad block, with one of the reserved blocks. Such an operation may be referred to as a "remapping operation."

The FTL 111 may perform operations such as garbage collection GC, wear leveling, and the like. For example, the FTL 111 may manage the number of program/erase (P/E) cycles of the plurality of memory blocks included in the storage device 100A, and may perform wear leveling such that the number of P/E cycles of the memory blocks may be equalized. The FTL 111 may perform a garbage collection operation of programming valid data, among data included in at least one memory block, into a free memory block and erasing at least one memory block.

Figure 4:
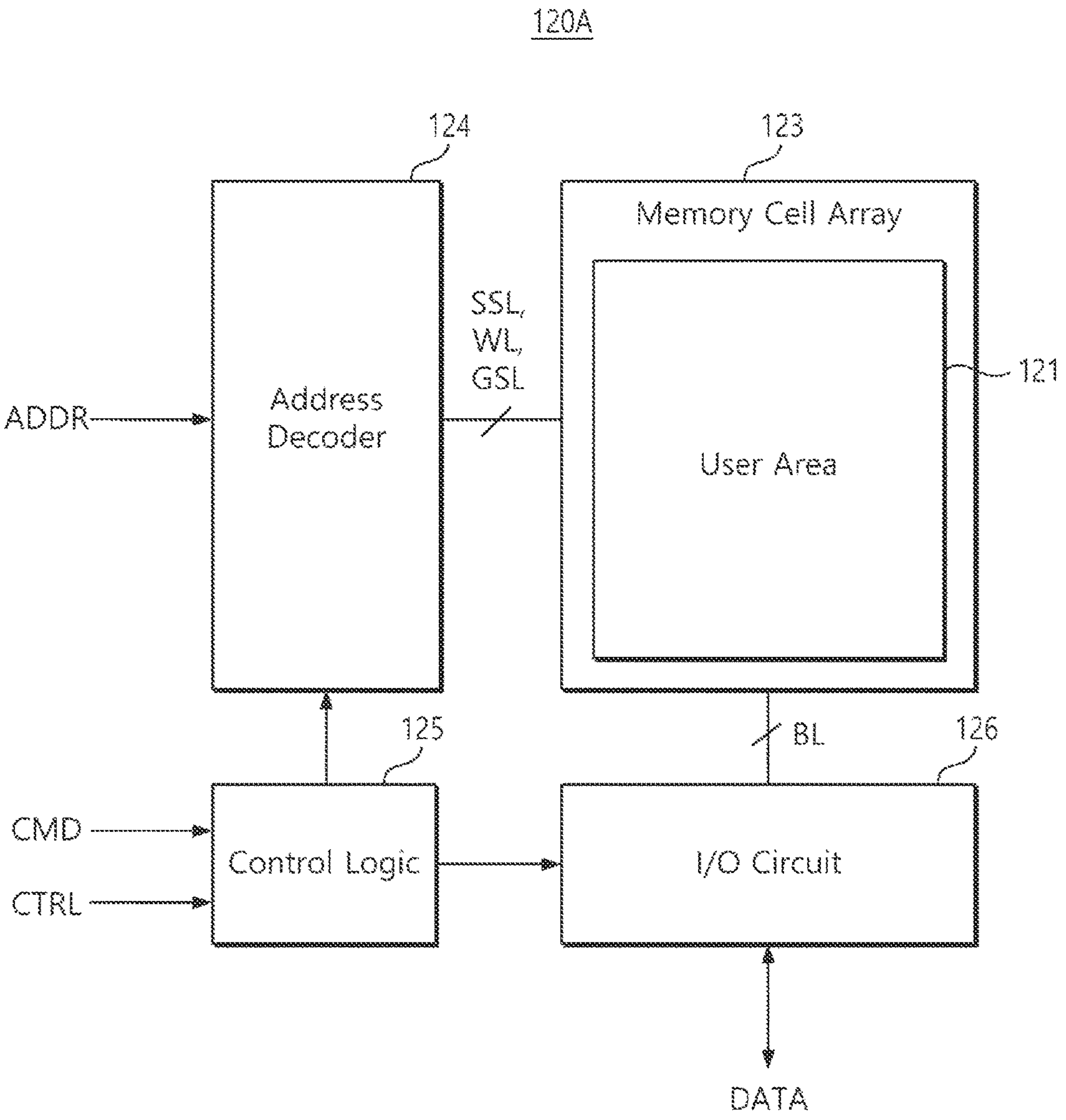
FIG. 4 is a diagram illustrating an example of implementing a nonvolatile memory according to an example embodiment.

FIG. 4 is a diagram illustrating an example of implementing a nonvolatile memory according to an example embodiment. Referring to FIGS. 1, 2, and 4, a nonvolatile memory 120A may include a memory cell array 123, an address decoder 124, a control logic 125, and an input/output (I/O) circuit 126.

The memory cell array 123 may include a user area 121. The user area 121 may be an area in which user data is stored, and may include a plurality of user blocks.

The plurality of user blocks may all be memory blocks. A memory block may include a plurality of strings, and each of the plurality of strings may include a plurality of memory cells. Each of the plurality of memory cells may be provided as a single-level cell (SLC), in which one bit is stored in each memory cell, or a multi-level cell (MLC) in which two or more bits are stored in each memory cell.

The address decoder 124 may be connected to the memory cell array 123 through a string select line (SSL), a ground select line (GSL), and a plurality of wordlines (WLs). The address decoder 124 may receive a physical address ADDR, and may decode the received physical address ADDR. The address decoder 124 may control voltages of the SSL, the GSL, and the plurality of WLs based on the decoded address.

The control logic 125 may control the address decoder 124 and the I/O circuit 126 in response to a CMD and a CTRL. The control logic 125 may generate various voltages required when the nonvolatile memory 124A operates. For example, the control logic 125 may control a voltage generator, not illustrated, to generate various voltages such as a plurality of read voltages, a plurality of program voltages, a plurality of pass voltages, and a plurality of erase voltages.

The I/O circuit 126 may be connected to the memory cell array 123 through a plurality of bitlines (BLs). The I/O circuit 126 may program DATA, received from the controller 110A, into the memory cell array 123. In this case, the I/O circuit 126 may operate as a write driver. The I/O circuit 123 may read DATA stored in the memory cell array 123, and may transmit the read DATA to the controller 110. In this case, the I/O circuit 126 may operate as a sense amplifier.

Figure 5:
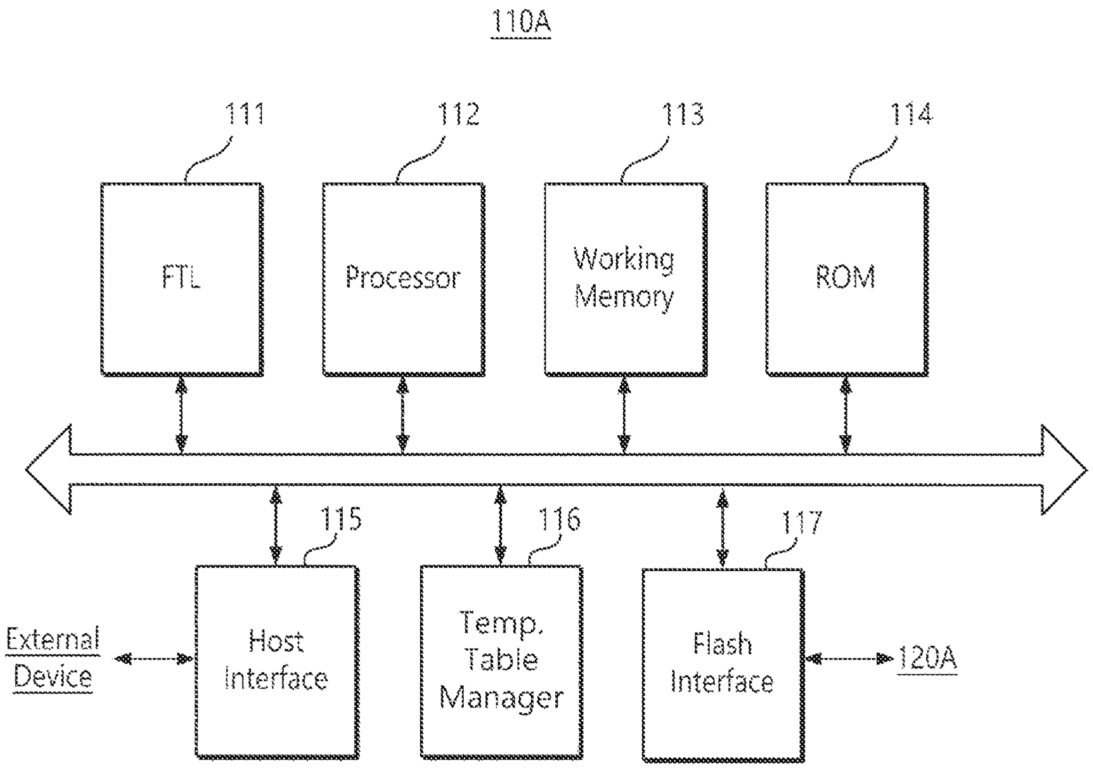
FIG. 5 is a diagram illustrating an example of implementing a controller according to an example embodiment.

FIG. 5 is a diagram illustrating an example of implementing a controller according to an example embodiment. Referring to FIG. 5, a controller 110A may include an FTL 111, a processor 112, a working memory 113, a ROM 114, a host interface 115, a temperature table manager 116, and a flash interface 117.

The FTL, the temperature table manager 116 have already been described with reference to FIGS. 1 to 4, and redundant descriptions thereof will be omitted.

The working memory 113 may store data used in an operation of the controller 110A. For example, the working memory 113 may temporarily store data processed by the processor 112 or data to be processed by the processor 112. The working memory 113 may be used as a buffer or cache memory of the controller 110A.

To this end, the working memory 113 may include a volatile memory such as an SRAM, a DRAM, or an SDRAM, and/or a nonvolatile memory such as a flash memory, a PRAM, an MRAM, an ReRAM, or an FRAM.

For example, the working memory 113 may store temperature information of a nonvolatile memory 120A at the time of performing a program operation. For example, temperature information obtained based on a first program operation may be matched with identification information of a predetermined number of super pages and then stored in the working memory 113.

According to an example embodiment, the working memory 113 may store a temperature table in which the temperature information of the nonvolatile memory 120A at the time of performing the first program operation is listed. The temperature table may include a first area in which temperature information on a plurality of user blocks included in the user area 121 is managed in units of super blocks. In this case, the first area may include first sub-temperature tables in which temperature information on user blocks included in each super block is stored in units of a predetermined number of super pages. The temperature table and the sub-temperature table will be described in more detail later.

The processor 112 may control the overall operation of the controller 110A. The processor 112 may process various types of arithmetic operations and/or logical operations. To this end, the processor 112 may include a special-purpose logic circuit (for example, a field programmable gate array (FPGA), application specific integrated chips (ASICs), or the like) configured to process operations. For example, the processor 112 may include one or more processor cores, and may be implemented with a general-purpose processor, a special-purpose processor, and/or an application processor, but example embodiments are not limited thereto.

For example, the processor 112 may control an operation of the nonvolatile memory 120A including a plurality of user blocks. For example, the processor 112 may manage the plurality of user blocks in units of super blocks.

Accordingly, the processor 112 may store temperature information, associated with the first program operation, in the working memory 113 in units of a predetermined number of super pages. For example, the processor 112 may obtain temperature information through the temperature sensor 105 based on the first program operation, and may match the obtained temperature information with identification information of a predetermined number of super pages and then store the matched temperature information in the working memory 113.

According to an example embodiment, the processor 112 may drive the FTL 111 and the temperature table manager 116 provided in the form of software. In this case, an operation of the temperature table manager 116 described above in FIG. 2 may be performed by the processor 112.

According to example embodiments, the temperature table manager 116 may be implemented as a hardware logic, separately from the processor 112. In this case, operations of the processor 112, associated with the above-described temperature information, may be performed by the temperature table manager 116.

The processor 112 may read a mapping table and a temperature table stored in the nonvolatile memory 120A. The mapping table and the temperature table, read from nonvolatile memory 120A, may be stored in the working memory 113 and managed by the processor 112.

The ROM 114 may store various types of information, required when the controller 110A operates, in the form of firmware.

The controller 110A may communicate with an external device through the host interface 115. For example, the host interface 115 may be various interfaces such as a universal serial bus (USB), a multimedia card (MMC), an embedded-MMC, a peripheral component interconnection (PCI), a PCI-express, an advanced technology attachment (ATA), a serial-ATA, a parallel-ATA, a small computer small interface (SCSI), an enhanced small disk interface (ESDI), an integrated drive electronics (IDE), a mobile industry processor interface (MIPI), and a nonvolatile memory-express (NVM-e). The controller 110A may communicate with the nonvolatile memory 120A through the flash interface 117.

Although not illustrated in the drawing, the controller 110A may further include a sensor interface, not illustrated, transmitting a request for temperature information to the temperature sensor 105 or receiving the temperature information from the temperature sensor 150.

In FIG. 5, an example embodiment has been described where the working memory 113 is included in the controller 110A, but example embodiments are not limited thereto. The working memory 113 may be included in an external device, and the processor 112 may be connected to the working memory 113, included in the external device, through the host interface 115 to perform operations associated with the working memory 113 described above or to be described later.

Figure 6:
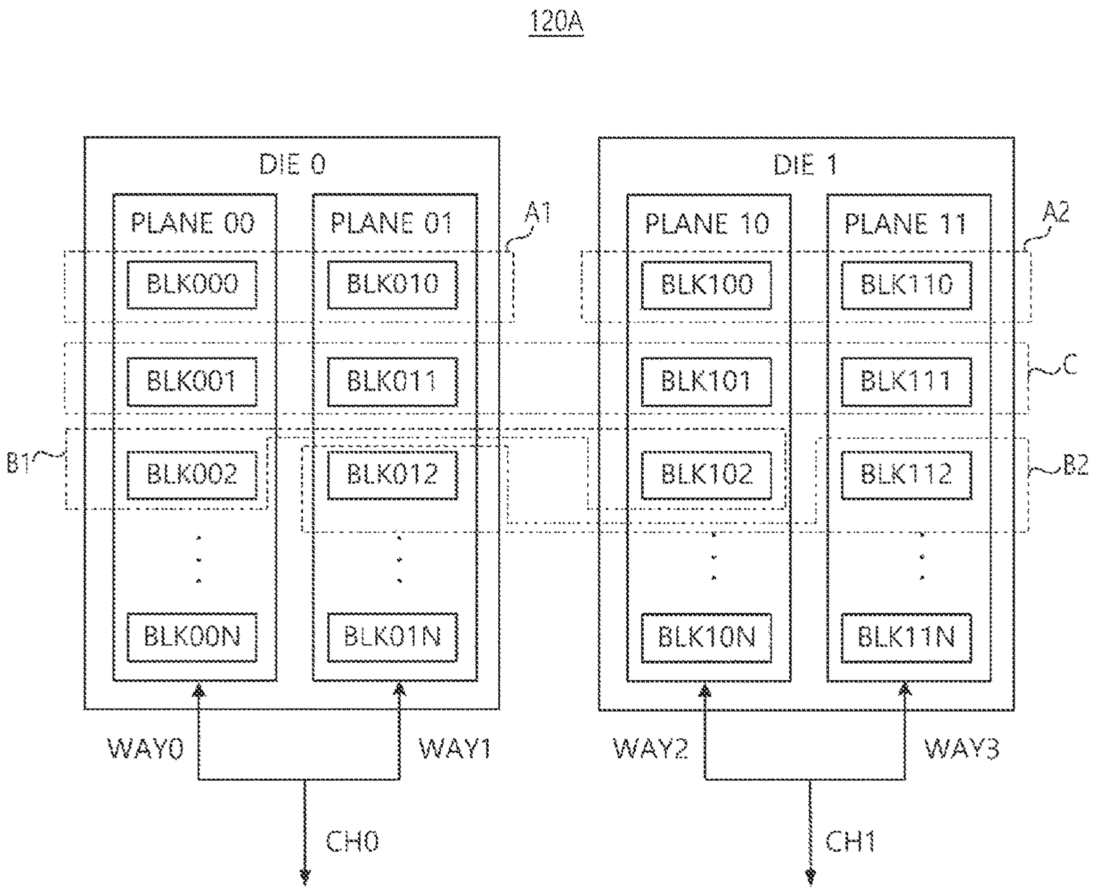
FIG. 6 is a conceptual diagram illustrating a super block according to an example embodiment.

FIG. 6 is a conceptual diagram illustrating a super block according to an example embodiment. FIG. 6 illustrates an example of a detailed configuration of the nonvolatile memory 120A.

Referring to FIG. 6, the nonvolatile memory 120A may include a plurality of memory blocks BLK000, BLK001, BLK002 to BLK00N, BLK010, BLK011, BLK012 to BLK01N, BLK100, BLK101, BLK102 to BLK10N, and BLK110, BLK111, BLK112 to BLK11N.

The nonvolatile memory 120A may include a first memory die DIE0, which may input and output data through a 0-th channel CH0, and a second memory die DIE1 which may input and output data through a first channel CH1. In this case, the 0-th channel CH0 and the first channel CH1 may input and output data in an interleaving scheme.

The first memory die DIE0 may include a plurality of planes PLANE00 and PLANE01, respectively corresponding to a plurality of ways WAY0 and WAY1 sharing the 0-th channel CH0 to input and output data in the interleaving scheme. The second memory die DIE1 may include a plurality of planes PLANE10 and PLANE11, respectively corresponding to a plurality of ways WAY2 and WAY3 sharing the first channel CH1 to input and output data in the interleaving scheme.

As illustrated in the drawing, PLANE00 may include BLK000, BLK001, BLK002 to BLK00N, PLANE01 may include BLK010, BLK011, BLK012 to BLK01N, PLANE10 may include BLK100, BLK101, BLK102 to BLK10N, and PLANE11 may include BLK110, BLK111, BLK112 to BLK11N.

As described above, a plurality of blocks included in the nonvolatile memory 120A may have physical locations divided based on ways or channels.

In FIG. 6, an example has been described where two memory dies are included in the nonvolatile memory 120A, two planes are included in each of the memory dies, and (N+1) memory blocks are included in each of the planes. However, this is merely exemplary, and the number of memory dies included in the nonvolatile memory 120, the number of planes included in each of the memory dies, and the number of memory blocks included in each of the planes may vary depending on selection of a designer.

The controller 110A may group a plurality of memory blocks based on whether the plurality of memory blocks may be simultaneously selected, rather than the above-described physical locations, and may then manage the plurality of memory blocks in units of super blocks.

There may be various manners, in which the controller 110A groups a plurality of memory blocks and then manages the plurality of memory blocks in units of super blocks, depending on selection of a designer. In FIG. 6, three manners are illustrated as examples.

A first manner is a manner in which a single block of a first plane, included in a single memory die, and a single block of a second plane, included in the single memory die, are grouped and then managed as a super block. In FIGS. 6, A1 and A2 represent a super block grouped by the first manner.

A second manner is a manner in which a single block of a first plane of a first memory die and a single block of a first plane of a second memory die are grouped and a single block of a second plane of the first memory die and a single block of a second plane of the second memory die are grouped, and then the grouped blocks are managed as a super block. In FIGS. 6, B1 and B2 represent a super block grouped by the second manner.

A third manner is a manner in which a single block of a first plane included in a first memory die and a single block of a second plane included in the first memory die, and a single block of a first plane included in a second memory die and a single block of a second plane included in the second memory die are grouped and then managed as a super block. In FIG. 6, C represents a super block grouped in the third manner.

Memory blocks, included in a single super block, may be selected substantially simultaneously through various interleaving manners such as channel interleaving, memory die interleaving, memory chip interleaving, and way interleaving, regardless of a manner of grouping the memory blocks.

For example, in example embodiments, the controller 110A may group and manage a plurality of user blocks in units of super blocks. Since user blocks included in a super block may be simultaneously selected, the controller 110A may perform a program operation on the plurality of user blocks in units of super blocks.

Figure 7:
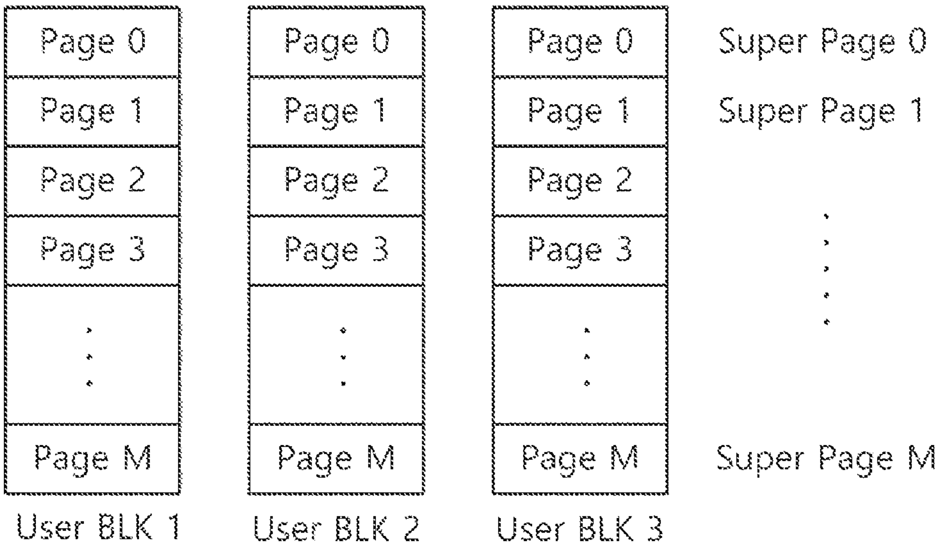
FIG. 7 is a conceptual diagram illustrating a super page according to an example embodiment.

FIG. 7 is a conceptual diagram illustrating a super page according to an example embodiment. In FIG. 7, a user block 1 User BLK1, a user block 2 User BLK2, and a user block 3 User BLK3 represent user blocks grouped into a single super block. Each user block includes (M+1) pages Page 0 to Page M.

In this case, the super page may include a single page of each of the user blocks constituting the super block. For example, referring to FIG. 8, Super Page 0 may include Page 0 of each of user blocks 1 to 3, and Super Page 1 may include Page 1 of each of user blocks 1 to 3. Similarly, the remaining super pages may each include a single page of each of user blocks 1 to 3. As a result, the super block may include (M+1) super pages Super Page 0 to Super Page M.

As described above, user blocks included in a super block may be simultaneously selected, and the controller 110A may perform a program operation in units of super blocks. In this case, the controller 110A may sequentially perform a program operation on the super pages constituting the super block in units of super pages, and respective pages included in a single super page may have temporal simultaneity in relation to the program operation.

In FIG. 7, as an example, a case has been described where the same number of pages constitute a super page, but example embodiments are not limited thereto. For example, the super page has only to include a single page of each of the user blocks constituting the super block, so that different numbers of pages may constitute the super page for each user block.

As described above, when temperature information is managed in units of super pages, memory usage may be reduced. In detail, when temperature information is managed in general program units, for example, in units of pages, temperature information at the time of programming each page is stored in each user block, so that, for example, 3*(M+1) pieces of temperature information may be stored. However, when temperature information is managed in units of a single super page according to an example embodiment, the temperature information is stored in units of super pages, so that only (M+1) pieces of temperature information may be stored and memory usage for storing the temperature information may be reduced by ⅓ times, as compared with the case in which temperature information is managed in units of pages. When the temperature information is managed in units of two super pages, the memory usage may be reduced by ⅙ times. When the temperature information is managed in units of a single super block, the memory usage may be reduced by 1/(3*(M+1)) times.

Figure 8A:
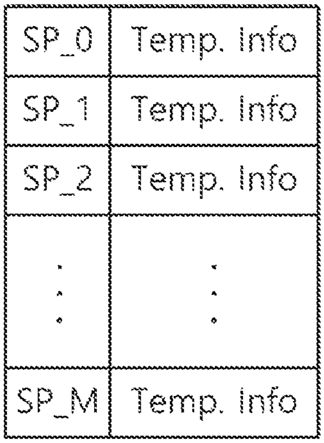
FIG. 8A is a diagram illustrating an example of a sub-temperature table for the super block of FIG. 7.
Figures 8B, 9:
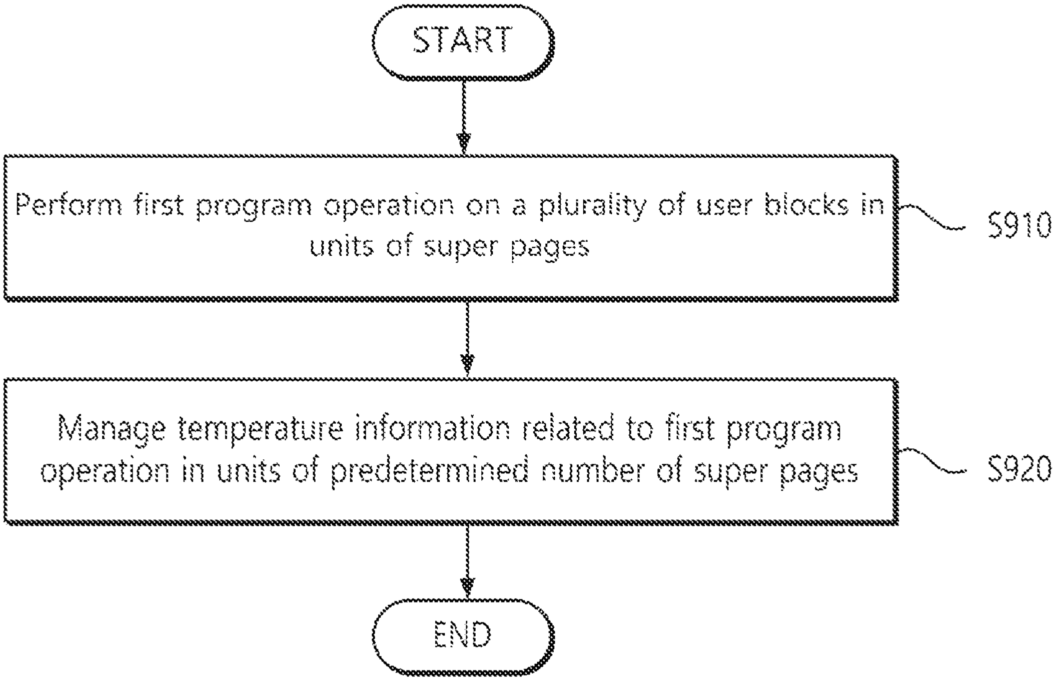
FIG. 8B is a diagram illustrating another example of a sub-temperature table for the super block of FIG. 7.
FIG. 9 is a flowchart illustrating a method of operating a storage device according to an example embodiment.

FIG. 8B is a diagram illustrating another example of a sub-temperature table for the super block of FIG. 7.

As described above, a single super page has temporal simultaneity in terms of program operation, so that the controller 110A may manage temperature information in units of a single super page according to an example embodiment.

FIG. 8A illustrates an example of a sub-temperature table for the super block of FIG. 7. In FIG. 8A, SP_0 to SP_M represent examples of identification information for Super Page 0 to Super Page M of FIG. 7, respectively, and Temp. Info represents temperature information for each super page. As can been from FIG. 8A, temperature information for a super block may be managed in units of a single super page.

For example, when a program command for super pages included in the super block of FIG. 7 is received, the controller 110A may perform a program operation sequentially on the corresponding super pages in units of super pages. In this case, the controller 110A may obtain temperature information through the temperature sensor 105 whenever a program operation is performed on a single super page, match the obtained temperature information with the identification information of the corresponding super page as illustrated in FIG. 8A, and update the matched temperature information in a temperature table.

Although a single super page has temporal simultaneity in terms of a program operation, a temperature is unlikely to be significantly changed while a program operation is performed successively on a plurality of super pages in consideration of a program operation speed of the controller 110A. Therefore, according to example embodiments, the controller 110A may manage the temperature information in units of a plurality of super pages.

According to an example embodiment, the controller 110A may manage temperature information in units of two consecutive super pages.

FIG. 8B illustrates another example of a sub-temperature table for the super block of FIG. 7. In FIG. 8B, SP_0,1 represents an example of identification information for Super Page 0 and Super Page 1 of FIG. 7, SP_2,3 represents an example of identification information for Super Page 2 and Super Page 3 of FIG. 7, SP_4,5 represents an example of identification information for Super Page 4 and Super Page 5 of FIG. 7, and SP_M−1,M represents an example of identification information for Super Page M−1 and Super Page M of FIG. 7. In addition, Temp. Info represents temperature information for about two super pages indicated by each identification information. As can be seen from FIG. 8B, temperature information for a super block may be managed in units of two consecutive super pages.

For example, when a program command for super pages included in the super block of FIG. 7 is received, the controller 110A may perform a program operation sequentially on the corresponding super pages in units of super pages. In this case, the controller 110A may obtain temperature information through the temperature sensor 105 whenever a program operation is performed on two consecutive super pages, match the obtained temperature information with identification information for the corresponding super pages, and update the matched temperature information in a temperature table as illustrated in FIG. 8B. In this case, according to an example embodiment, the controller 110A may obtain and update temperature information at the time of performing a program operation of a super page, programmed first, of the two super pages, or may obtain and update temperature information during a program operation of a super page, programmed second, of the two super pages. Alternatively, the controller 110A may obtain each temperature information and then update an average value.

In FIG. 8B, an example has been described where temperature information is managed in units of two consecutive super pages. However, according to example embodiments, the controller 110A may manage temperature information in units of three or more super pages. Alternatively, the controller 110A may manage temperature information in units of super blocks (for example, in units of all super pages included in a super block).

FIG. 9 is a flowchart illustrating a method of operating the storage device 100A according to an example embodiment. The storage device 100A may include a nonvolatile memory 120A including a plurality of user blocks.

Referring to FIG. 9, in operation S910, the storage device 100A may perform a first program operation in units of super pages of a super block into which a plurality of user blocks are grouped.

In operation S920, the storage device 100A may manage temperature information, associated with the first program operation, in units of a predetermined super pages. For example, the storage device 100A obtain the temperature information through the temperature sensor 105 based on the first program operation, match the obtained temperature information with identification information of the predetermined number of super pages, and store the matched temperature information in the working memory 113.

Figure 10:
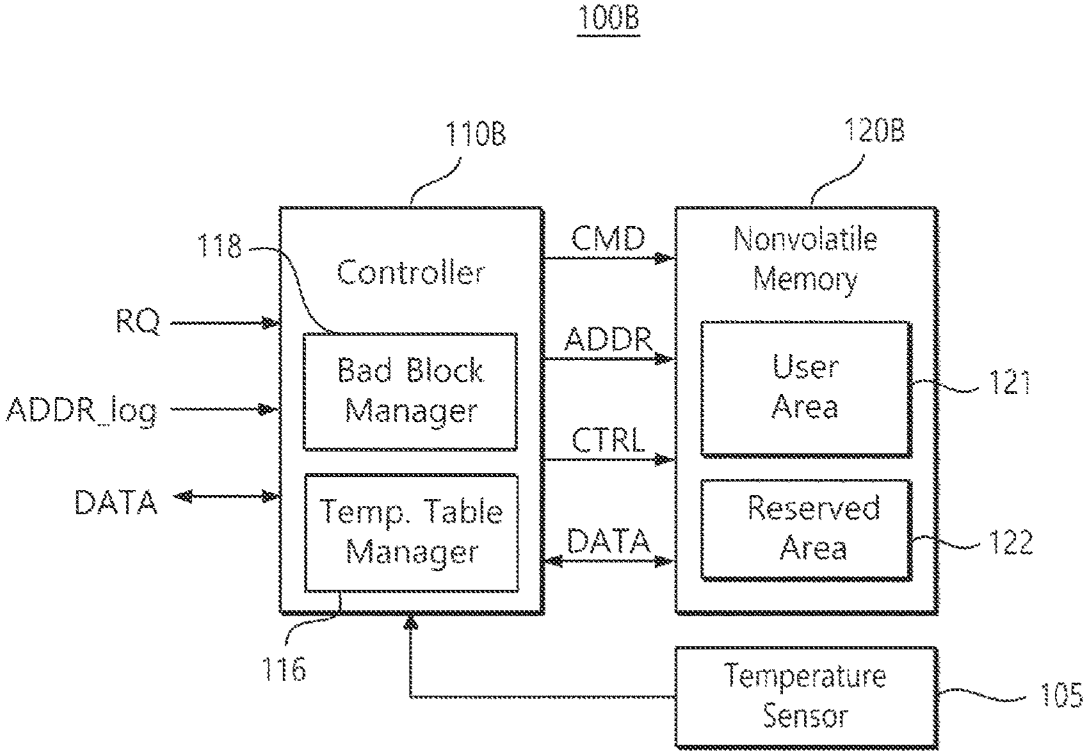
FIG. 10 is a block diagram illustrating an example of implementing a storage device according to an example embodiment.

FIG. 10 is a block diagram illustrating an example of implementing a storage device according to an example embodiment. Referring to FIG. 10, the storage device 100B may include a controller 110B and a nonvolatile memory 120B.

In the storage device 100B of FIG. 10, compared with the storage device 100A of FIG. 2, the controller 110B further includes a bad block manager 118 and the nonvolatile memory 120B further includes a reserved area 122. Therefore, descriptions provided above with respect to FIG. 6 will be omitted herein, and only differences will be described.

Referring to FIG. 10, the nonvolatile memory 120B may further include the reserved area 122 in addition to a user area 121. The reserved area 122 may be an area including a plurality of reserved blocks to replace a bad block when among a plurality of user blocks included in the user area 121, a user block is turned into the bad block.

When more than a predetermined number of memory cells, among memory cells in a user block, reach the end of their lifespan or are physically damaged to be no longer usable, a user block including the corresponding memory cells may be turned into a bad block. In addition, a user block including memory cells, which are unusable from the beginning due to manufacturing process issues, may also be turned into a bad block. Such bad blocks may be replaced with reserved blocks of the reserved area 122.

To this end, the controller 110B may include the bad block manager 118. The bad block manager 118 may replace a bad block with one of the reserved blocks of the reserved area 122 when the bad block occurs in the user area 121.

According to an example embodiment, the controller 110B may manage a plurality of reserved blocks of the reserved area 122 in units of blocks. For example, the controller 110B may perform a second program operation on the plurality of reserved blocks in units of pages (hereinafter, a program operation performed in units of pages will be referred to as a "second program operation")

Also, the controller 110B may manage temperature information, associated with the second program operation, in units of a predetermined number of pages. For example, the controller 110B may obtain temperature information through the temperature sensor 105 based on the second program operation, match the obtained temperature information with identification information of the predetermined number of pages, and store the matched temperature information in the working memory 113.

For example, in an example embodiment in which temperature information is managed in units of one page, the controller 110B may obtain temperature information of the nonvolatile memory 120B from the temperature sensor 105 when a program operation of a corresponding page is performed, match the obtained temperature information with identification information of the corresponding page, and store the matched temperature information in the working memory 113.

Alternatively, in an example embodiment in which temperature information is managed in units of two pages, the controller 110B may obtain temperature information of the nonvolatile memory 120B from the temperature sensor 105 when a program operation of the corresponding pages is performed, match the obtained temperature information with identification information of the corresponding pages, and store the matched temperature information in the working memory 113. In this case, according to example embodiments, the controller 110B may obtain and store temperature information during a program operation of a page, programmed first, of the two pages, or may obtain and store temperature information during a program operation of a page, programmed later, of the two pages. Alternatively, the controller 110B may obtain each temperature information and then store an average value.

Example embodiments, in which temperature information is managed in units of three or more super pages, are also possible and will be understood in the same manner as described above.

According to an example embodiment, temperature information may be managed through a temperature table. To this end, the temperature table manager 116 may manage a temperature table in which the temperature of the nonvolatile memory 120B at the time of performing the program operation is listed.

For example, the temperature table manager 116 may update a temperature table. For example, according to an example embodiment, the temperature table may include a second area in which temperature information on a plurality of reserved blocks, included in a reserved area, is managed in units of blocks. In this case, the second area may include second sub-temperature tables corresponding to each reserved block, and temperature information on a corresponding reserved block is listed, in units of a predetermined number of pages, in each of the second sub-temperature tables. Accordingly, the temperature table manager 116 may obtain temperature information from the temperature sensor 105 based on the second program operation and update a corresponding second sub-temperature table to update the temperature table.

According to an example embodiment, the temperature table may include a first area, in which temperature information on a plurality of user blocks area managed in units of super blocks, and a second area in which temperature information on a plurality of reserved blocks are managed in units of blocks. Therefore, the temperature table manager 116 may update the obtained temperature information in the first area when a location, in which a program command is executed, is included in the plurality of user blocks, and may update the obtained temperature information in the second area when a location, in which a program command is executed, is included in the plurality of reserved blocks.

As described above, according to an example embodiment, in the case of reserved blocks, temperature information is managed in units of a predetermined number of pages, separately from user blocks. Therefore, the temperature information may be utilized without deterioration in performance of the storage device 100B even when a bad block occurs and is replaced with a reserved block.

A detailed description of an issue, occurring when temperature information on reserved blocks is not separately managed, will be provided. For example, when among user blocks a1, a2, and a3 included in a super block A, the user block a2 is turned into a bad block, the user block a2 may be replaced with a reserved block (for example, r1) among a plurality of reserved blocks r1 to rn.

In this case, when a program operation is performed on the super block A, data to be programmed into the user block a2 may be programmed into the reserved block r1. In this case, the temperature information may be stored in units of a predetermined number of super pages for the super block A, as described above. For example, temperature information on the reserved block r1 may not be stored separately.

When a data read operation is then performed on the super block A, the temperature information on the super block A should be read and used together. In this case, in the case of the user blocks a1 and a3, the temperature information on the super block A may be obtained in parallel with the data read operation and the obtained temperature information may be used in the data read operation.

However, in the case of the reserved block r1 corresponding to the user block a2, a separately stored temperature information is not present, so that a process of identifying a source block of the reserved block r1 may be additionally required. For example, in the case of the reserved block r1, temperature information may not be obtained in parallel with the data read operation, and the source block of the reserved block r1 may be traced back and temperature information on the super block A, in which a traced-back block a2 is included, may then be obtained. This may cause a deterioration in performance of the storage device.

However, as described above, according to an example embodiment, the temperature information on the reserved blocks may be managed, separately from the user blocks. Therefore, the temperature information may be obtained in parallel with the data read operation even in the case of the reserved block r1. As a result, the above-described issue may be addressed.

Since a software layer of an external device and the storage device 100B illustrated in FIG. 10 may be the same as the software layer 10 described above with reference to FIG. 3, a redundant description thereof is omitted. In addition, since the nonvolatile memory 120B is substantially the same as the nonvolatile memory 120A of FIG. 4 except that the reserved area 122 is further included in the memory cell array 123, a redundant description of the example of implementing the nonvolatile memory 120B is also omitted.

Figure 11:
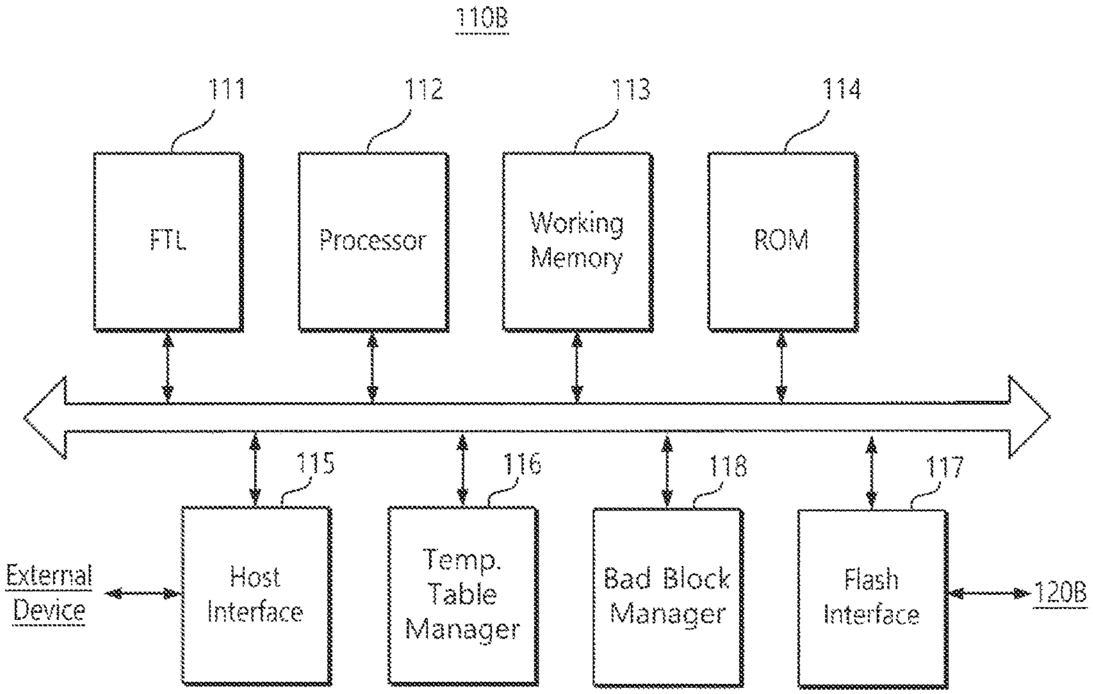
FIG. 11 is a diagram illustrating an example of implementing a controller according to an example embodiment.

FIG. 11 is a diagram illustrating an example of implementing a controller according to an example embodiment. Referring to FIG. 11, the controller 110B may include an FTL 111, a processor 112, a working memory 113, a ROM 114, a host interface 115, a temperature table manager 116, a flash interface 117, and a bad block manager 118.

The FTL 111, the processor 112, the working memory 113, the ROM 114, the host interface 115, the temperature table manager 116, and the flash interface 117 are the same as those of the controller 110A of FIG. 5, and redundant descriptions thereof will be omitted and only differences will be mainly described.

Temperature information, obtained based on a second program operation, may be matched with identification information of a predetermined number of pages and then stored in the working memory 113.

According to an example embodiment, the working memory 113 may store a temperature table in which temperature information of the nonvolatile memory 120B at the time of performing the second program operation is listed. In this case, the temperature table may include a second area in which temperature information on a plurality of reserved blocks included in the reserved area 122 is managed in units of blocks. In this case, the second area may include second sub-temperature tables in which temperature information on each reserved block is stored in units of a predetermined number of pages.

The processor may control an operation of the nonvolatile memory 120B further including a plurality of reserved blocks. For example, the processor 112 may manage the plurality of reserved blocks in units of blocks.

Accordingly, the processor 112 may store temperature information, associated with the second program operation, in the working memory 113 in units of a predetermined number of pages. For example, the processor 112 may obtain temperature information through the temperature sensor 105 based on the second program operation, match the obtained temperature information with identification information of the predetermined number of pages, and store the matched temperature information in the working memory 113.

According to an example embodiment, the processor 112 may drive the FTL 111, the bad block manager 118, and the temperature table manager 116 provided in the form of software. In this case, operations of the temperature table manager 116 and the bad block manager 118 described above may be performed by the processor 112.

According to example embodiments, the bad block manager 118 may be implemented as a hardware logic, separately from the processor 112. In this case, operations of the bad block manager 118 may be separately performed by the bad block manager 118.

Figure 12:
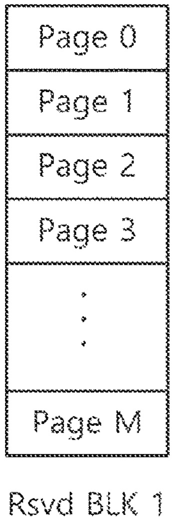
FIG. 12 is a diagram illustrating a reserved block according to an example embodiment.

FIG. 12 is a diagram illustrating a reserved block according to an example embodiment. Referring to FIG. 12, a reserved block Rsvd BLK1 may include (M+1) pages from blocks illustrated in FIG. 7 is turned into a bad block, the user block turned into a bad block may be replaced with the reserved block of FIG. 12.

FIGS. 13A and 13B are diagrams, each illustrating a sub-temperature table for a reserved block.

According to an example embodiment, the controller 110B may manage temperature information for a reserved block in units of pages.

FIG. 13A illustrates an example of the sub-temperature table for a reserved block of FIG. 12. In FIG. 13A, P_0 to P_M represent examples of identification information for the pages Page 0 to Page M of FIG. 12, respectively, and Temp. Info represents temperature information for each super page. As can be seen from FIG. 13A, temperature information for a reserved block may be managed in units of a single page.

For example, when a program command for the super pages included in the super block of FIG. 7 is received in a state in which, among the user blocks of FIG. 7, the user block User BLK2 is turned into a bad block and replaced with the reserved block Rsv BLK1 of FIG. 12, the controller 110B may perform a program operation on pages of the reserved blocks Rsvd BLK1 for pages of the user block User BLK2, among pages of the super pages. In this case, the controller 110B may obtain temperature information through the temperature sensor 105 whenever a program operation is performed on a single page of the reserved block Rsvd BLK1, match the obtained temperature information with identification information of the corresponding page of the reserved block Rsvd BLK1, and update the matched temperature information in the temperature table as illustrated in FIG. 13A.

According to an example embodiment, the controller 110B may manage temperature information in units of a plurality of pages. According to an example embodiment, the controller 110 may manage temperature information in units of two consecutive pages.

FIG. 13B illustrates another example of a sub-temperature table for the reserved block of FIG. 12. In FIG. 13B, P_0,1 represents an example of identification information for Page 0 and Page 1 of FIG. 12, P_2,3 represents an example of identification information for Page 2 and 3 of FIG. 12, P_M−1,M represents an example of identification information for Page 4 and Page 5 of FIG. 12. In addition, Temp. Info represents temperature information for two pages indicated by each identification information. As can be seen from FIG. 13B, the temperature information on the reserved block may be managed in units of two consecutive pages.

For example, when a program command for super pages included in the super block of FIG. 7 is received in a state in which the user block User BLK2, among the user blocks of FIG. 7, is turned into a bad block and is replaced with the reserved block Rsvd BLK1 of FIG. 12, the controller 110B may perform a program operation on pages of the reserved block Rsvd BLK1 for pages of the user block User BLK2, among the pages of the super pages. In this case, the controller 110B may obtain temperature information through the temperature sensor 105 whenever a program operation is performed on two consecutive pages, match the obtained temperature information with identification information for the corresponding pages, and update the matched temperature information in the temperature table as illustrated in FIG. 13B. In this case, according to example embodiments, the controller 110B may obtain and update temperature information at the time of performing a program operation of a page, programmed first, of the two pages, or may obtain and update temperature information at the time of performing a program operation of a page, programmed second, of the two pages. Alternatively, the controller 110B may obtain each temperature information and then update an average value.

In FIG. 13B, an example has been described where temperature information is managed in units of two consecutive pages. However, according to example embodiments, the controller 110B may manage the temperature information in units of three or more pages. Alternatively, the controller 110B may manage the temperature information in units of blocks (for example, in units of all pages included in a block).

Figure 14:
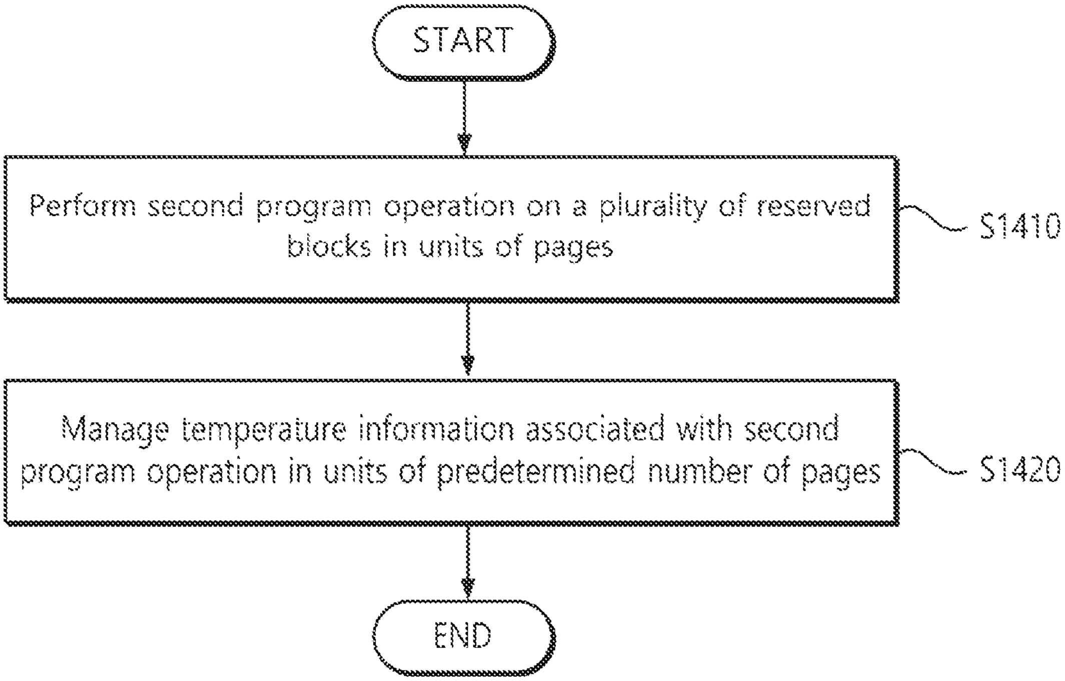
FIG. 14 is a flowchart illustrating a method of operating a storage device according to an example embodiment.

FIG. 14 is a flowchart illustrating a method of operating the storage device 100B according to an example embodiment. The nonvolatile memory 120B included in the storage device 100B may include a plurality of reserved blocks replacing a bad block when among a plurality of user blocks, a user block is turned into the bad block.

Referring to FIG. 14, in operation S1410, the storage device 100B may perform a second program operation on a plurality of reserved blocks in units of pages.

In operation S1420, the storage device 100B may manage temperature information, associated with the second program operation, in units of a predetermined number of pages. For example, the storage device 100B may obtain temperature information through the temperature sensor 105 based on the second program operation, match the obtained temperature information with identification information of the predetermined number of pages, and store the matched temperature information in the working memory 113.

Figure 15:
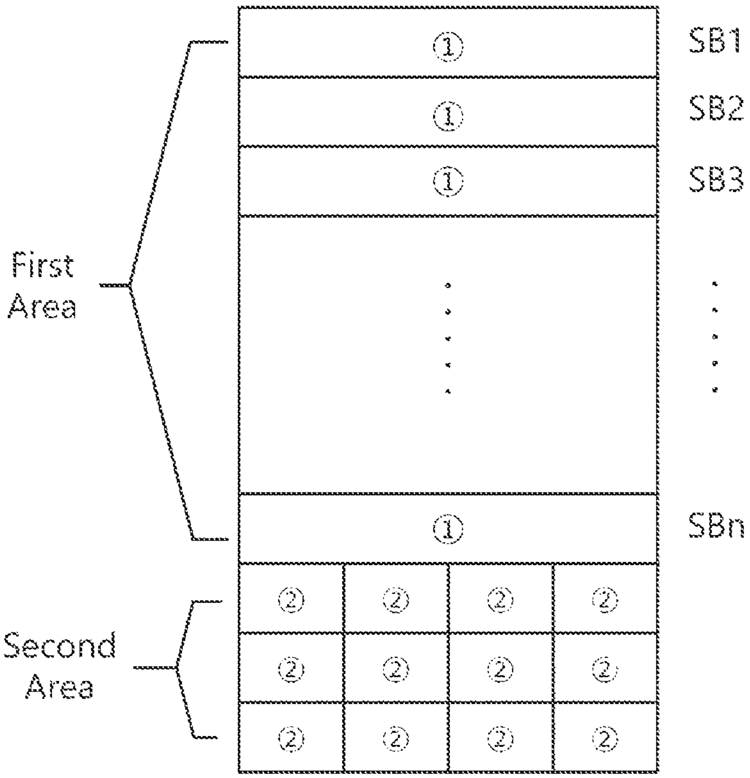
FIG. 15 is a diagram illustrating a temperature table according to an example embodiment.

FIG. 15 is a diagram illustrating a temperature table according to an example embodiment.

Referring to FIG. 15, the temperature table may include a first area, in which temperature information at the time of performing program operation on a plurality of user blocks is managed in units of super blocks, and a second area in which temperature information at the time of performing a program operation on a plurality of reserved blocks is managed in units of blocks.

In this case, the first area may include first sub-temperature tables ① in which temperature information on user blocks, included in respective super block SB1 to SBn, is stored in units of a predetermined number of super pages. The sub-temperature table described above with reference to FIGS. 8A and 8B may be an example of the first sub-temperature table.

The second region may include second sub-temperature tables ② in which temperature information on respective reserved block is stored in units of a predetermined number of pages. The sub-temperature table described above with reference to FIGS. 13A and 13B may be an example of the second sub-temperature table.

According to an example embodiment, the controller 110B may identify a location of the nonvolatile memory 120 in which the program operation is to be performed in response to a program command, and may perform a program operation in the identified location. In this case, the controller 110B may obtain temperature information through the temperature sensor 105 while performing the program operation.

For example, when a program request RQ, address ADDR_log, and DATA are received from an external device, the controller 110B may translate a logical address ADDR_log into a physical address ADDR based on a mapping table. Accordingly, the controller 110 may identify the address ADDR of the nonvolatile memory 120B into which data is to be programmed, and may program data into the identified location.

In this case, the controller 110B may update obtained temperature information in the first area when the location, in which the data is programmed, is included in the user area 121 including a plurality of user blocks. When the location, in which data is programmed, is included in the reserved area 122 including a plurality of reserved blocks, the controller 110 may update the obtained temperature information in the second area.

As can be seen from FIG. 15, unlike user blocks in which temperature information is managed in units of super blocks, temperature information may be separately managed in units of blocks for reserved blocks. Accordingly, even when a bad block occurs and is replaced with a reserved block, the temperature information may be utilized without deterioration in performance of the storage device 100B.

Figure 16:
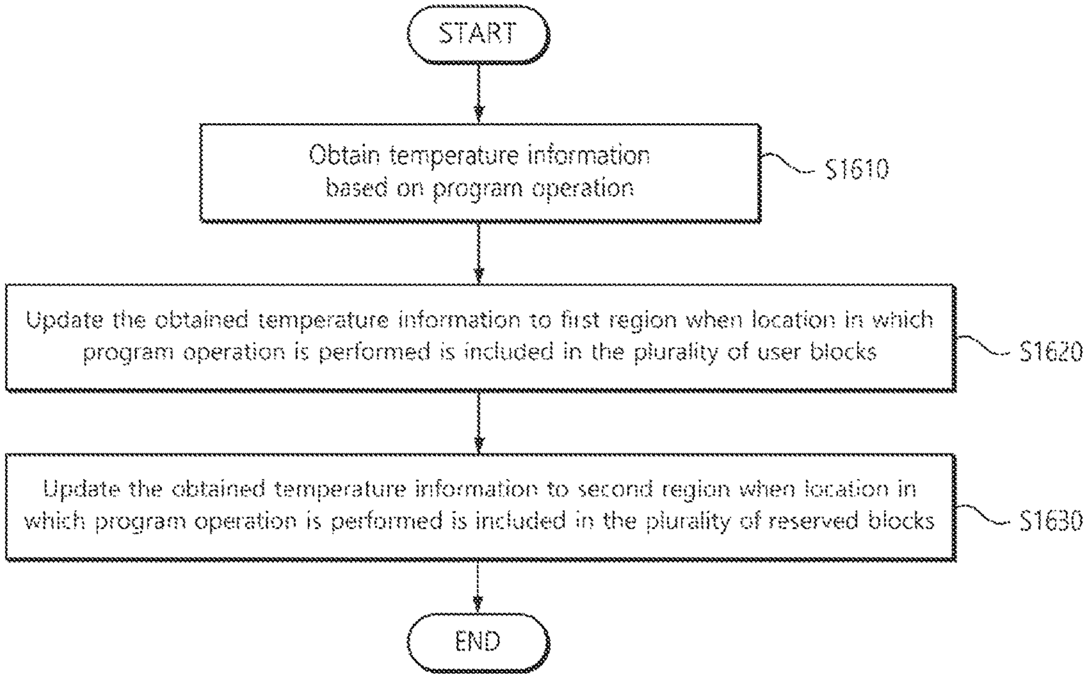
FIG. 16 is a flowchart illustrating a method of operating a storage device according to an example embodiment.

FIG. 16 is a flowchart illustrating a method of operating a storage device according to an example embodiment.

Referring to FIG. 16, in operation S1610, the storage device 100B may obtain temperature information from the temperature sensor 105 based on first or second program operations, and may update the obtained temperature information in a temperature table.

In this case, the temperature table may include a first area, in which temperature information on a plurality of user blocks is managed in units of super blocks, and a second area in which temperature information on a plurality of reserved blocks is managed in units of blocks.

The first area may include first sub-temperature tables in which temperature information on user blocks included in each super block is stored in units of a predetermined number of super pages, and the second area may include second sub-temperature tables in which temperature information on each reserved block is stored in units of the predetermined number of pages.

In operation S1620, the storage device 100B may update the obtained temperature information in the first area when the location, in which the program operation is performed, is included in the plurality of user blocks.

In operation S1630, the storage device 100B may update the obtained temperature information in the second area when the location, in which the program operation is performed, is included in the plurality of reserved blocks.

The storage device 100B may perform a read operation based on the temperature table.

Figure 17:
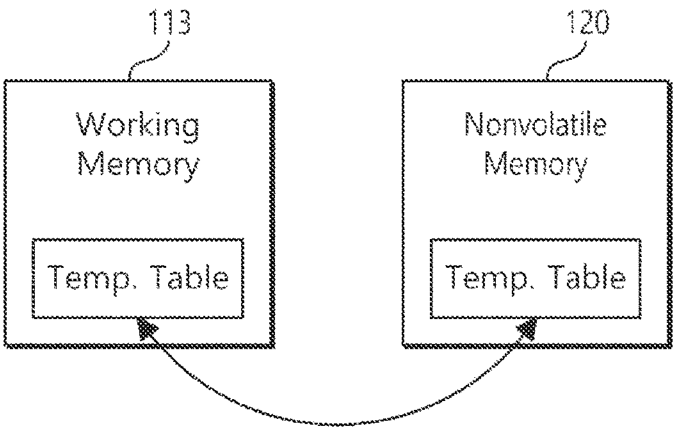
FIG. 17 is a diagram illustrating a method of managing a temperature table according to an example embodiment.

FIG. 17 is a diagram illustrating a method of managing a temperature table according to an example embodiment.

The above-described temperature table may be stored in the nonvolatile memory 120 when power of the storage device 100 is turned off, and may be loaded into the working memory 113 to be utilized or updated in a read operation of the nonvolatile memory 120 when power of the storage device 100 is turned on.

To this end, according to an example embodiment, the controller 110 may store a temperature table Temp. Table, stored in the working memory 113, in the nonvolatile memory 120 for an idle time or while the power of the storage device 100 is turned off. Also, when the power of the storage device 100 is turned on, the controller 110 may load the temperature table, stored in the nonvolatile memory 120, into the working memory 113.

According to the above-described various embodiments, temperature information may be managed in units of a predetermined number of super pages or in units of a predetermined number of pages. Thus, memory usage for temperature information may be reduced.

In addition, temperature information may be managed in units of a predetermined number of pages for the reserved blocks, separately from user blocks. Accordingly, even when a bad block occurs and is replaced with a reserved block, the temperature information may be utilized without deterioration in performance of the storage device 100 or the controller 110.

As set forth above, according to example embodiments, temperature information may be more efficiently stored to reduce usage of a working memory.

According to an example embodiment, the method according to the above-described embodiments may be provided as being included in a computer program product. The computer program product may be traded as a product between a seller and a consumer. The computer program product may be distributed online in the form of machine-readable storage media (for example, compact disc read only memory (CD-ROM)) or through an application store (for example, Play Store™) or distributed online. In the case of online distribution, at least a portion of the computer program product may be at least temporarily stored or temporarily generated in a server of the manufacturer, a server of the application store, or a machine-readable storage medium such as memory of a relay server.

According to example embodiments, the respective elements (for example, module or program) of the elements mentioned above may include a single entity or a plurality of entities. Furthermore, at least one element or operation from among the corresponding elements mentioned above may be omitted, or at least one other element or operation may be added. Alternatively or additionally, a plurality of components (e.g., module or program) may be combined to form a single entity. As such, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While example embodiments have been shown and described above, it will be apparent to those skilled in the art that modifications and variations could be made without departing from the scope of the concept as defined by the appended claims.

What is claimed is:

1. A storage device, comprising:

a nonvolatile memory comprising a plurality of user blocks and a plurality of reserved blocks for replacing a bad block when among the plurality of user blocks, a user block is turned into the bad block; and a controller configured to manage the plurality of user blocks in units of super blocks, each super block comprising multiple user blocks of the plurality of user blocks and a plurality of super pages, wherein the controller is configured to perform a first program operation in units of super pages of a super block and manages first temperature information, associated with the first program operation, in units of a predetermined number of super pages that is greater than one super page and fewer than the plurality of super pages of the super block, wherein each super page comprises at least one page of each of the multiple user blocks of a respective super block, and wherein the controller is configured to perform a second program operation on the plurality of reserved blocks in units of pages and manage second temperature information, associated with the second program operation, in units of a predetermined number of pages.

2. The storage device of claim 1, further comprising:

a temperature sensor; and a working memory, wherein the controller obtains the first temperature information through the temperature sensor based on the first program operation, matches the obtained first temperature information with identification information of the predetermined number of super pages, and stores the matched first temperature information in the working memory.

3. The storage device of claim 2, wherein the controller obtains the second temperature information through the temperature sensor based on the second program operation, matches the obtained second temperature information with identification information of the predetermined number of pages, and stores the matched second temperature information in the working memory.

4. The storage device of claim 3, wherein:

the controller updates the obtained first or second temperature information in a temperature table loaded into the working memory; and the temperature table comprises a first area, in which temperature information on the plurality of user blocks is managed in units of the super blocks, and a second area, in which temperature information on the plurality of reserved blocks is managed in units of the blocks.

5. The storage device of claim 4, wherein:

the first area comprises first sub-temperature tables in which temperature information on user blocks, included in each of the super blocks, is stored in units of the predetermined number of super pages; and the second area comprises second sub-temperature tables in which temperature information on each of the reserved blocks is stored in units of the predetermined number of pages.

6. The storage device of claim 4, wherein the controller is configured to:

update the obtained first temperature information in the first area when a location, in which the first program operation is performed, is included in the plurality of user blocks; and update the obtained second temperature information in the second area when a location, in which the second program operation is performed, is included in the plurality of reserved blocks.

7. The storage device of claim 4, wherein the controller is configured to:

store the temperature table, stored in the working memory, in the nonvolatile memory for an idle time or while power of the storage device is turned off, and load the temperature table, stored in the nonvolatile memory, into the working memory when the power of the storage device is turned on.

8. The storage device of claim 4, wherein the controller performs a read operation based on the temperature table loaded into the working memory.

9. The storage device of claim 2, wherein:

the nonvolatile memory is a NAND flash memory; and the working memory comprises at least one of a dynamic random access memory (DRAM)

or a static random access memory (SRAM).

10. A method of operating a storage device comprising a nonvolatile memory comprising a plurality of user blocks and a plurality of reserved blocks replacing a bad block when among the plurality of user blocks, a user block is turned into the bad block, the method comprising:

performing a first program operation in units of super pages of a super block into which the plurality of user blocks are grouped, wherein each super block comprises multiple user blocks of the plurality of user blocks and a plurality of super pages, and each super page comprises at least one page of each of the multiple user blocks of a respective super block;

managing first temperature information, associated with the first program operation, in units of a predetermined number of super pages that is greater than one super page and fewer than the plurality of super pages of the super block;

performing a second program operation on the plurality of reserved blocks in units of pages; and managing second temperature information, associated with the second program operation, in units of a predetermined number of pages.

11. The method of claim 10, wherein managing the first temperature information comprises:

obtaining the first temperature information based on the first program operation; and matching the obtained first temperature information with identification information of the predetermined number of super pages and storing the matched first temperature information.

12. The method of claim 11, wherein managing the second temperature information comprises:

obtaining the second temperature information based on the second program operation; and matching the obtained second temperature information with identification information of the predetermined number of pages and storing the matched second temperature information.

13. The method of claim 12, wherein storing the matched first or second temperature information comprises:

updating the obtained first or second temperature information in a temperature table, wherein the temperature table comprises a first area, in which temperature information on the plurality of user blocks is managed in units of the super blocks, and a second area, in which temperature information on the plurality of reserved blocks is managed in units of the blocks.

14. The method of claim 13, wherein:

the first area comprises first sub-temperature tables in which temperature information on user blocks, included in each of the super blocks, is stored in units of the predetermined number of super pages; and the second area comprises second sub-temperature tables in which temperature information on each of the reserved blocks is stored in units of the predetermined number of pages.

15. The method of claim 13, wherein updating the obtained first or second temperature information in the temperature table comprises:

updating the obtained first temperature information in the first area when a location, in which the first program operation is performed, is included in the plurality of user blocks; or updating the obtaining second temperature information in the second area when a location, in which the second program operation is performed, is included in the plurality of reserved blocks.

16. The method of claim 13, further comprising:

performing a read operation based on the temperature table.

17. A controller controlling an operation of a nonvolatile memory comprising a plurality of user blocks and a plurality of reserved blocks replacing a bad block when among the plurality of user blocks, a user block is turned into the bad block, the controller comprising:

a working memory; and at least one processor configured to manage the plurality of user blocks in units of super blocks, each super block comprising multiple user blocks of the plurality of user blocks and a plurality of super pages, wherein the at least one processor is configured to perform a first program operation in units of super pages of the super blocks and stores first temperature information, associated with the first program operation, in the working memory in units of a predetermined number of super pages that is greater than one super page and fewer than the plurality of super pages of the super block, wherein each super page comprises at least one page of each of the multiple user blocks of a respective super block, and wherein the at least one processor is configured to perform a second program operation on the plurality of reserved blocks in units of blocks and store second temperature information, associated with the second program operation, in the working memory in units of a predetermined number of pages.

* * * * *